US011950040B2

(12) United States Patent
Miller et al.

(10) Patent No.: US 11,950,040 B2
(45) Date of Patent: Apr. 2, 2024

(54) VOLUME CONTROL OF EAR DEVICES

(71) Applicant: Apple Inc., Cupertino, CA (US)

(72) Inventors: Thayne M. Miller, San Jose, CA (US);
John Greer Elias, Townsend, DE (US);
Jacob L. Matlick, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/471,101

(22) Filed: Sep. 9, 2021

(65) Prior Publication Data
US 2023/0074080 A1    Mar. 9, 2023

(51) Int. Cl.
| H04R 1/10 | (2006.01) |
| G06F 3/01 | (2006.01) |
| G06F 3/16 | (2006.01) |
| G06F 3/041 | (2006.01) |
| H04R 1/02 | (2006.01) |

(52) U.S. Cl.
CPC .......... H04R 1/1041 (2013.01); G06F 3/012 (2013.01); G06F 3/017 (2013.01); G06F 3/165 (2013.01); G06F 3/041 (2013.01); H04R 2430/01 (2013.01)

(58) Field of Classification Search
CPC ... H04R 1/1041; H04R 2430/01; G06F 3/012; G06F 3/017; G06F 3/165; G06F 3/041
USPC .................................................. 381/74, 334
See application file for complete search history.

(56) References Cited

U.S. PATENT DOCUMENTS

| 9,913,022 | B2 | 3/2018 | Susan et al. |
| 2014/0177873 | A1 | 6/2014 | Chang et al. |
| 2015/0131837 | A1* | 5/2015 | LeBoeuf .............. A61B 5/4848 |
| | | | 381/380 |
| 2019/0134468 | A1* | 5/2019 | Schillings ............... H02J 50/20 |
| 2019/0199846 | A1* | 6/2019 | Rostaing ................ G06F 3/165 |
| 2020/0288247 | A1 | 9/2020 | Reilly et al. |
| 2022/0028634 | A1* | 1/2022 | He ........................ H04R 1/1016 |

FOREIGN PATENT DOCUMENTS

| CN | 113727231 A | * 11/2021 |
| JP | H11283474 | 10/1999 |
| JP | 2003-515282 | 4/2003 |
| JP | 2012-514392 | 6/2012 |
| KR | 10-2020-0031062 | 3/2020 |
| KR | 10-2021-0008329 | 1/2021 |

* cited by examiner

Primary Examiner — Ammar T Hamid
(74) Attorney, Agent, or Firm — Fish & Richardson P.C.

(57) ABSTRACT

Embodiments are disclosed for volume control of ear devices. In an embodiment, a method comprises: determining a reference attitude of the ear device based on sensor data collected by motion sensors of the ear device; storing the reference attitude; receiving, with at least one processor, a first user input indicating a user request for a volume control mode of the ear device; receiving a rotation input; determining, with the at least one processor, an amount of volume level increase/decrease based on attitude change relative to the reference attitude due to the rotation input; adjusting a volume level of the ear device in accordance with the volume level increase/decrease; and receiving second user input indicating a second user request to release the volume control mode.

20 Claims, 4 Drawing Sheets

VOLUME CONTROL OF EAR DEVICES

TECHNICAL FIELD

This disclosure relates generally to volume control of ear devices.

BACKGROUND

Headphones are loudspeaker drivers worn on or over a user's ears. Earbuds, earpieces or in-ear monitors (IEMs) are loudspeaker drivers that fit into the user's ear canal. Bone reduction headphones typically wrap around the back of the head and rest in front of the ear canal. Headsets include loudspeakers and microphones where the loudspeakers can be headphones or IEMs. Each of these devices (hereinafter, collectively "ear devices") can be connected to a companion audio device (e.g., a smartphone, tablet computer) with a wired or wireless connection (e.g., a Bluetooth connection). Some modern ear devices have inertial sensors (e.g., an accelerometer) and a touch interface that allows the user to perform a limited number of functions, such as skipping or pausing audio tracks.

In many of these ear devices, the user controls the volume level of audio played through the ear devices at the companion audio device by moving a mechanical input device (e.g., a dial or slider) or moving an affordance on a touch interface (e.g., a virtual dial or slider). When using wireless ear devices, the user's hands may be occupied, preventing the user from adjusting the volume level at the companion audio device. For example, the user may be engaged in exercise or other physical activity that would make it difficult or inconvenient to access the companion audio device to adjust the volume level.

SUMMARY

Embodiments are disclosed for volume control of ear devices. In an embodiment, a method comprises: determining a reference attitude of the ear device based on sensor data collected by motion sensors of the ear device; storing the reference attitude; receiving, with at least one processor, a first user input indicating a user request for a volume control mode of the ear device; receiving a rotation input; determining, with the at least one processor, an amount of volume level increase/decrease based on attitude change relative to the reference attitude due to the rotation input; adjusting a volume level of the ear device in accordance with the volume level increase/decrease; and receiving second user input indicating a second user request to release the volume control mode.

In an embodiment, the first user input is a press and hold input.

In an embodiment, the second user input is a press and hold release input.

In an embodiment, after receiving the first user input, the ear device plays a tone or message through a loudspeaker indicating that the ear device has been transitioned into a volume control mode.

In an embodiment, the rotation input is a rotation of the ear device relative to a head of a user who is wearing the ear device.

In an embodiment, the rotation input is a rotation of the ear device together with a head of a user who is wearing the ear device as a single unit.

In an embodiment, the rotation input is due to nodding of the user's head.

In an embodiment, the rotation input is due to rotation of the user's head about an axis of rotation that is perpendicular to a top of the user's head.

In an embodiment, determining an amount of volume level increase or decrease based on attitude change relative to the reference attitude, further comprises: applying a logarithmic volume scaling function to the attitude change, such that volume increases or decreases exponentially with attitude change.

In an embodiment, an ear device comprises: a housing configured to be worn on or over a user's outer ear or in the user's ear canal; included in the housing: a loudspeaker; at least one inertial sensor; an input device; and at least one processor; memory storing instructions that when executed by the at least one processor, cause the at least one processor to perform operations comprising: determining a reference attitude of the ear device based on sensor data collected by the at least one inertial sensor; storing, in the memory, the reference attitude; receiving, with the input device, a first user input indicating a user request for a volume control mode of the ear device; receiving, with the at least one inertial sensor, a rotation input; determining an amount of volume level increase or decrease based on attitude change relative to the reference attitude due to the rotation input; adjusting a volume level of the ear device in accordance with the volume level increase or decrease; and receiving second user input indicating a second user request to release the volume control mode.

Other embodiments can include an apparatus, computing device and non-transitory, computer-readable storage medium.

Particular embodiments described herein provide one or more of the following advantages. The disclosed embodiments for volume control of ear devices enable easy and repeatable volume level change using existing hardware in many ear devices, such as touch interfaces and inertial sensors. This allows users to adjust volume of audio content without accessing a companion audio device.

The details of one or more implementations of the subject matter are set forth in the accompanying drawings and the description below. Other features, aspects and advantages of the subject matter will become apparent from the description, the drawings and the claims.

DETAILED DESCRIPTION

Figure 1A:
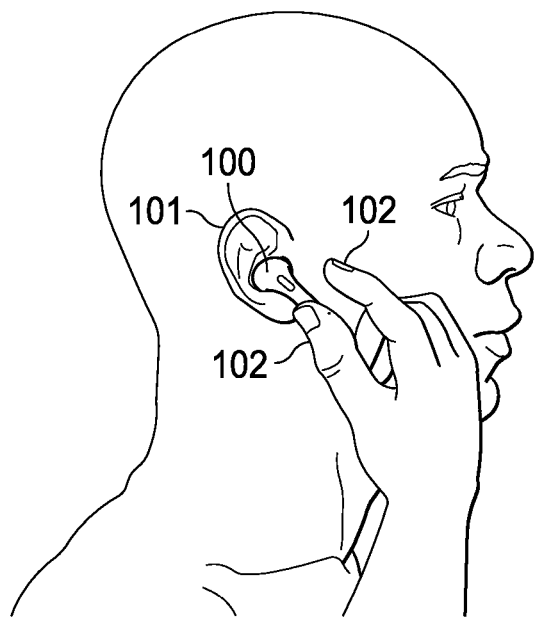
FIGS. 1A-1D illustrates volume control of an ear device, according to an embodiment.
Figure 1B:
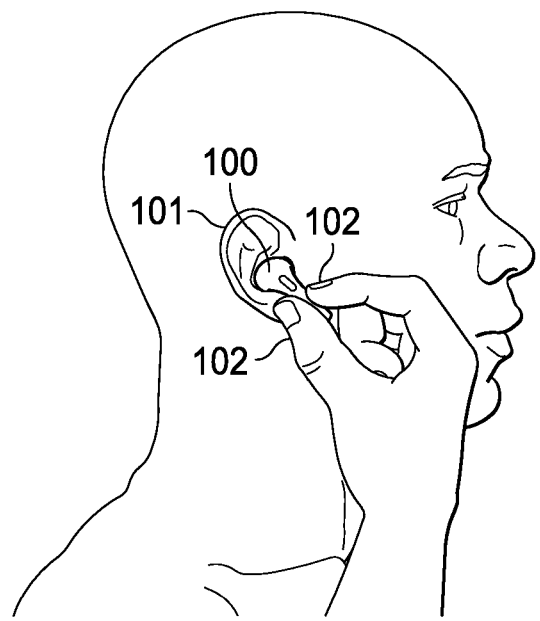
Figure 1C:
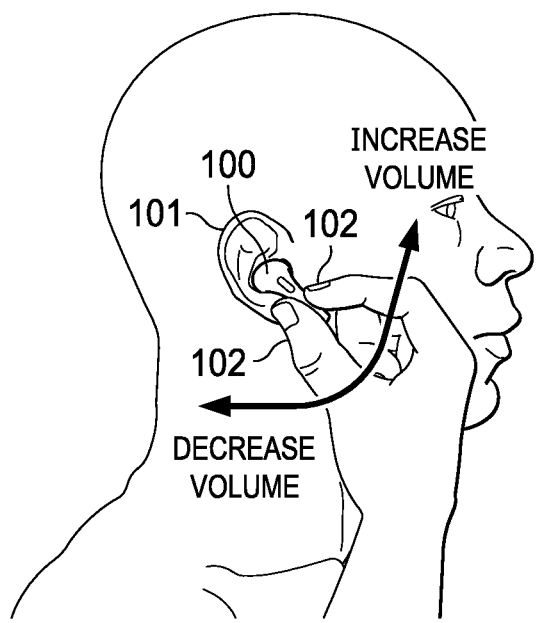

FIGS. 1A-1C illustrate volume control of an ear device, according to an embodiment. Referring to FIG. 1A, ear device 100 is shown inserted in ear canal 101. The user is pressing and holding a force sensor (e.g., force sensor 410 in FIG. 4) in the stem of ear device 100 with their thumb and index fingers 102. Before the act of pressing and holding, sensor data output by inertial sensors (e.g., IMU 405 in FIG. 4) in ear device 100 are used by a processor (e.g., processor 406 in FIG. 4) in ear device 100 to determine and store (e.g., store in cache memory of ear device 100) current attitude data (roll, pitch, yaw) of ear device 100. The current attitude data represents the current orientation of ear device 100 relative to, for example, a body coordinate system, where the origin of the body coordinate system is at the center of mass of ear device 100, and the three orthogonal axes of the body coordinate system are the principal axes of ear device 100 that rotate with ear device 100.

The stored attitude data is used as reference attitude data from which volume level changes will be measured as the user rotates ear device 100, as shown in FIG. 1C. For example, as the user rotates ear device 100, changes in attitude (yaw, pitch and roll) are measured from the reference attitude. In an embodiment, the angle changes can be represented as a delta quaternion. In an embodiment, the range of adjustable volume level is made coextensive with rotation angle displacement range, such that the volume level increases/decreases by an incremental mount as a function of incremental angle displacement and utilizes the full range of rotation displacement. For example, the range of rotation angle displacement can be limited so that the user does not have to make large rotations, which could dislodge the ear device 100 from the user's ear canal. The change in volume level L can increase/decrease with angle displacement according to a linear or non-linear function $f( )$:

$$L=f(\alpha,\beta,\gamma),\quad [1]$$

where $\alpha, \beta, \gamma$ are roll, pitch and yaw angles, respectively. If the roll, pitch and yaw rotations do not align with the axes of motion of the user's head the sensor data can be rotated into a reference frame fixed to the user's head.

As described above, volume level can be adjusted based on a user's head pose, including but not limited to: nodding (moving head up and down), turning (moving head left and right) and tilting (moving head towards shoulders). In an embodiment, a touch and hold (or similar input) is used as a time-based gesture and the head pose is used to initially determine the direction of volume change, so that the user need not hold their head in a non-neutral position. In an embodiment, volume level maps continuously with head position.

In an embodiment, the user moves their head in a direction to indicate whether to raise or lower the volume level, and then holds their head position to repeatedly increment/decrement the volume level. Example steps for this embodiment are as follows.

1. Wait for user interaction to indicate start of volume change control mode through input (e.g., touch, squeeze and hold, etc.).
2. Store the first motion sensor sample as a baseline attitude.
3. For each subsequent sample, apply the baseline to get the relative rotation.
4. Extract the rotation around the active axis (yaw, pitch, roll).
5. If the relative rotation is greater than some positive threshold:
   a. increment the volume up
   b. set the volume change direction as increasing
   c. start a repeating timer
6. If the relative rotation is less than some negative threshold:
   a. decrement the volume up
   b. set the volume change direction as decreasing
   c. start a repeating timer
7. If the threshold was exceeded in step 5 or 6, the user can return their head to a more natural position without impacting the volume control.
8. When the repeating timer activates, increase or decrease the volume depending on the direction set in steps 5 or 6.
9. When the user requests stopping the volume change mode, stop the repeating timer and ending volume change control mode.

Position to Volume Mapping

In an embodiment, volume control is based on relative rotation of the head as opposed to absolute orientation. If the motion sensor outputs absolute orientation with respect to are arbitrary zero reference orientation, the sensor data can be converted into current relative rotation data as follows:

1. If the sensor measurement is the first measurement after starting the volume control mode (via touch or other gate), the measurement is stored in memory as a baseline from which to measure subsequent rotations.
2. The baseline is applied to the new measurement (subtracted from the new measurement) to obtain a current relative rotation.
3. The rotation is extracted around the active axis (yaw, pitch, roll)
4. If the relative rotation is greater than some positive threshold:
   a. increment the volume level
   b. set the current absolute rotation as a new baseline
5. If the relative rotation is less than some negative threshold:
   a. decrement the volume level
   b. set the current absolute rotation as the new baseline In an embodiment, the example parameters in Table I can be used to tune the sensitivity and granularity of the user interaction. These parameters are interrelated, so only two parameters need to be set independently and the other parameters are then determined.

TABLE I

| Sensitivity/Granularity Parameters | |
|---|---|
| Parameter | Description |
| Degrees per increment | Amount of head motion required to increment the volume |
| Number of increments | Number of increments in the full volume range |
| Volume per increment | Amount of volume change in each increment |
| Volume per degree | Amount of volume change per degree of head motion |
| Total range of motion | Amount of head motion for the full volume range |

Continuous vs. Discrete

In an embodiment, the volume level can be controlled in discrete increments (as with physical volume buttons) or continuously (as with a slider). To avoid jitter, the incoming sensor data can be filtered (e.g., averaged).

Asymmetric Mapping

The mapping when raising the volume may be different than when lowering the volume. This may help if a person has limited neck mobility in one direction (for example as a result of an injury) or if you start the interaction un-centered.

Non-linear Mapping

In an embodiment, the sensitivity of volume level adjustment is not uniform throughout the user' head range of motion or the volume range. For example, there may be a larger threshold to cross for the first increment to help reject accidental triggers, the volume change may be rate limited for hearing safety, the sensitivity may vary with the velocity of head motion and the sensitivity could be higher or lower at the start of the interaction versus near the end of the volume range.

Feedback

In an embodiment, audio feedback is used during the user interaction. For example, any number and types sounds can be used for volume increments/decrements (up could be different than down) and when reaching the volume level limits (minimum and maximum). The sounds can be any suitable volume level and mixed with audio. In an embodiment, haptic feedback (e.g., vibration) is used to indicate volume increments/decrements and/or when the volume level limits are reached.

Accidental Triggers

In an embodiment, accidental triggers can be rejected. As mentioned above, a larger initial threshold can be used. The threshold may depend on detecting other motion: stationary vs. walking vs. running. The correlation between motion of the two ear buds can be used to reject accidental triggers where one is being adjusted. Device form factor plays an important role in accidentals (e.g. separating fit adjustment from interaction). Designing a gate that is more resistant to accidentals.

Example Gates

Although touch and hold gestures were described herein as gate for entering and exiting a volume control mode, a number of different options for gating the interaction can be used including but not limited to: touch, force, button, tap, proximity and voice, as well as different variations of each, such as touch, touch and hold, tapping, double tapping and tap-and-a-half.

Figure 1D:
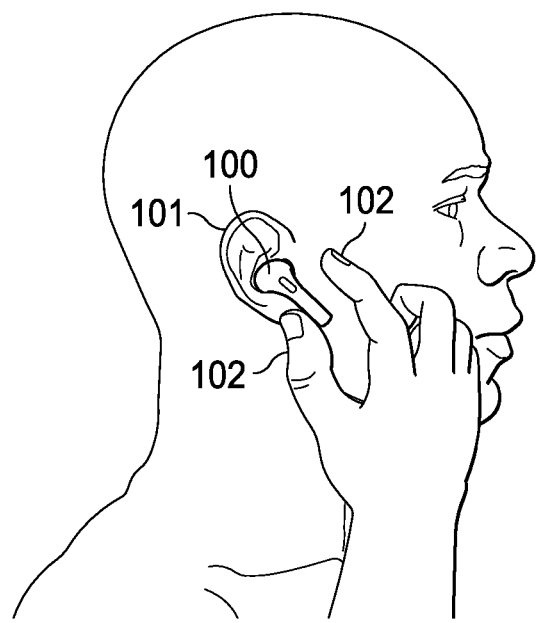

Referring to FIG. 1B, the user is shown pressing and holding the protruding stem of ear device 100 with fingers 102. In the embodiment shown, the protruding stem includes a force sensor 410 that responds to pressure as previously described. In other embodiments, the protruding stem of ear device 100, or any portion of the housing of earbud 100 can include a touch sensor (e.g., capacitive sensor). After N seconds (e.g., N=1 or 2 seconds) of continuous press and hold input (or touch and hold input), ear device 100 plays a tone and/or audio message indicating to the user that ear device 100 has been placed into a volume level change mode. The user can then rotate ear device 100 relative to their head or nod/rotate their head and ear-device as a single unit to adjust volume as described in reference to FIGS. 2A-2C. After the user stops the press and hold input, the new volume level will be in effect as shown in FIG. 1D.

In some embodiments, rather than press and hold, the user can use a different type of touch control, such as tapping or swiping the communication interface. In some embodiments, the user can use a combination of touch/gesture on the communication interface and a voice command. In some embodiments, other functions can be performed other than volume changes. For example, rotating ear device 100 or nodding/rotating their head, a user can fast forward or backward, skip tracks or perform any other function.

Figure 2A:
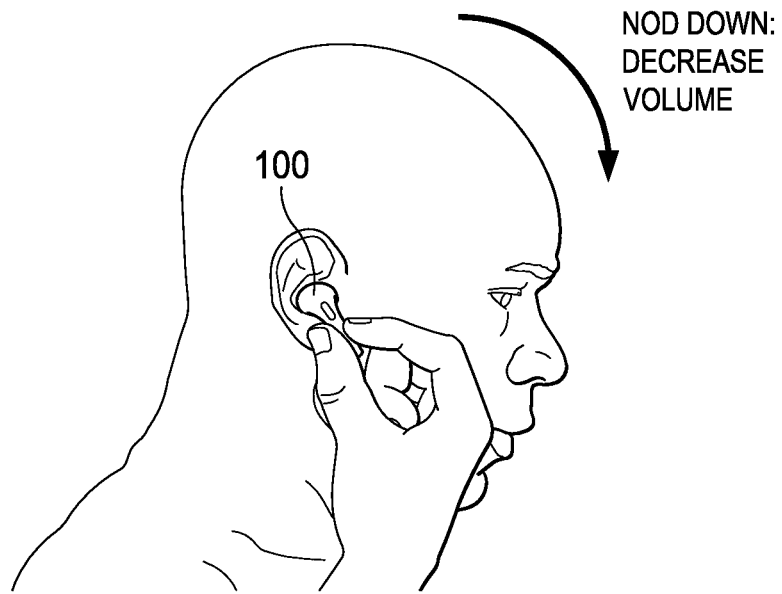
FIGS. 2A-2C illustrate rotation methods for increasing/decreasing volume level, according to an embodiment.

Referring to FIG. 2A, in a first embodiment, after the tone or message is played the user can rotate ear device 100 relative the user's head about an axis of rotation that is perpendicular to ear canal 101 (parallel with the longitudinal length of the ear canal) as shown (e.g., a pitch axis). In an embodiment, rotating clockwise about the axis of rotation decreases volume and rotating counterclockwise increases volume, or vice-versa.

Figure 2B:
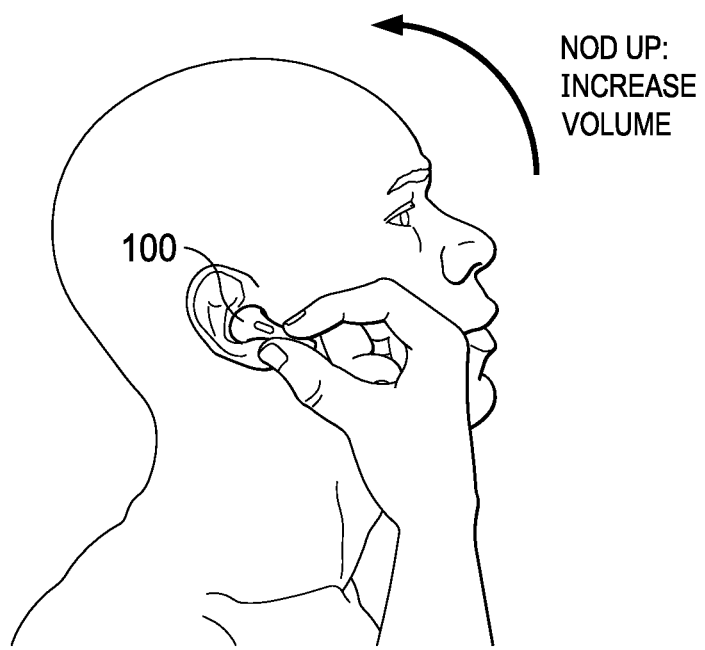
Figure 2C:
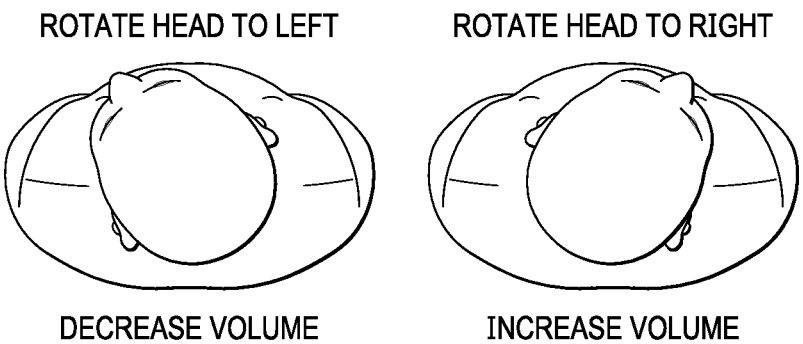

Referring to FIGS. 2B and 2C, in a second embodiment, after the tone or message is played the user can nod their head about the axis of rotation, such that ear device 100 and the user's head rotates as a single unit. In an embodiment, nodding their head clockwise about the axis of rotation decreases volume and nodding their head counterclockwise increases volume or vice-versa. Note that the user may rest their hand on their cheek to ensure ear device 100 and their head rotate together as one unit. Otherwise, when the user nods their head while pressing and holding force sensor 410, ear device 100 may not rotate with the head.

Referring to FIG. 2C, in a third embodiment, after the tone or message is played the user can rotate their head about an axis of rotation that is perpendicular to the top of the user's head as shown (e.g., a yaw axis).

Figure 3:
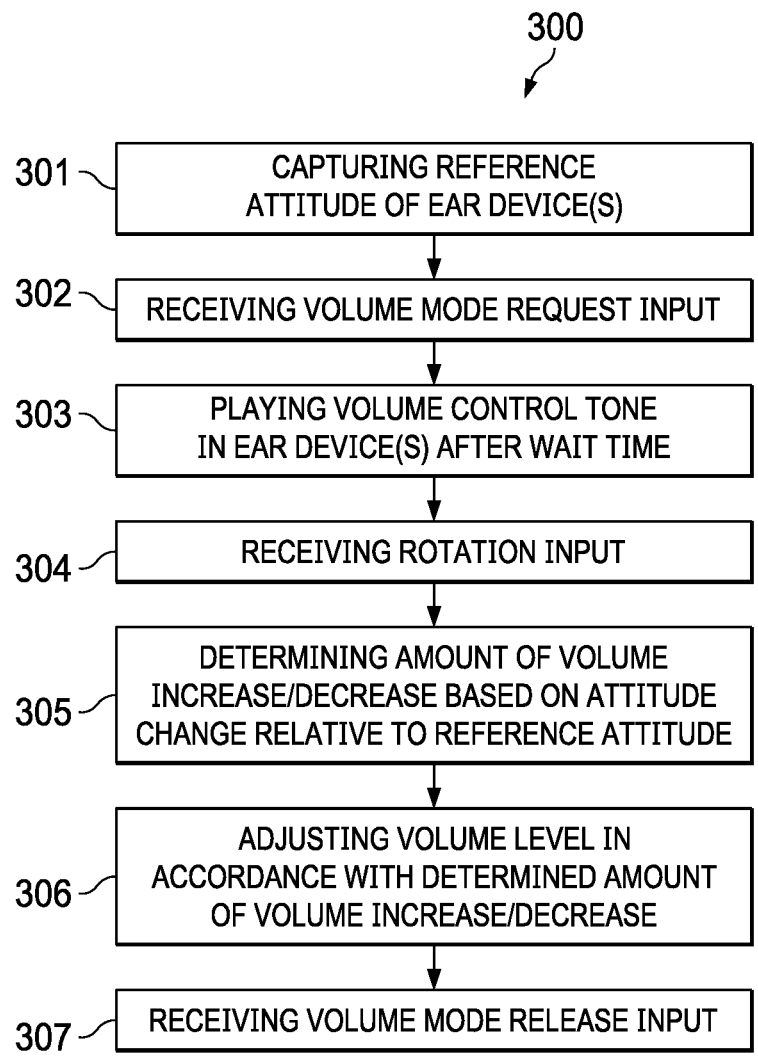
FIG. 3 is a flow diagram of a process of volume control of an ear device, according to an embodiment.

FIG. 3 is a flow diagram of a process 300 of volume control of ear device 100, according to an embodiment. Process 300 can be implemented by one or both earbuds of a wireless headset, as described in reference to FIG. 4.

Process 300 begins by capturing a reference attitude of the ear device (301) worn on or over the outer ear or in the ear canal of a user. For example, a snapshot of the attitude can be made by processor in the ear device based on sensor data (e.g., acceleration data) and stored in, for example, flash or processor cache memory (not shown) of the ear device. Note that acceleration data can be used to determine a gravity vector which can be subtracted from the acceleration data using techniques known in the art.

Process 300 continues by receiving a first user input (e.g., a press and hold input) from the user of the ear device (302). For example, the user can press and hold a force or capacitive touch sensor, as described in reference to FIG. 4. In some embodiments, other touch input and/or gestures can be used, such as tapping and swiping on a touch sensitive surface. In some embodiments, touch/gesture input can be used in combination with other inputs, such as voice commands spoken by the user.

Process 300 continues by playing a volume control tone/message through the loudspeakers of one or both ear devices (303). In an embodiment, the tone can be one or more beeps or any other pattern of tones. In an embodiment, an audio message can be played, such as playing the phrase "volume control" or any other suitable phrase. In another embodiment, tones and an audio message can be played.

Process 300 continues by receiving rotation input from the user (304). For example, while pressing and holding the force sensor or touch surface the user can rotate the ear device about an axis of rotation that is perpendicular to ear of the user. The rotation is sensed by one or more inertial sensors in the ear device (e.g., IMU 405). Clockwise rotation can decrease volume and counterclockwise rotation can increase volume, or vice-versa. In another embodiment, the user nods or rotates their head as described in reference to FIGS. 2A-2C. The rotation angle and direction can be computed by the processor based on sensor data, for example, as a delta quaternion in body system coordinates.

Process 300 can continue by determining an amount of volume level increase or decrease based on the change in attitude (e.g., changing in pitch angle) relative to the stored reference attitude (305).

Process 300 can continue by adjusting the volume level in accordance with the determined amount of volume increase/decrease (306). For example, an audio amplifier in the ear device can be adjusted to increase/decrease volume level.

Process 300 can continue by receiving a second user input (e.g., a press and hold release input) (307). In response to the second user input the new volume will be in effect on the ear device.

Figure 4:
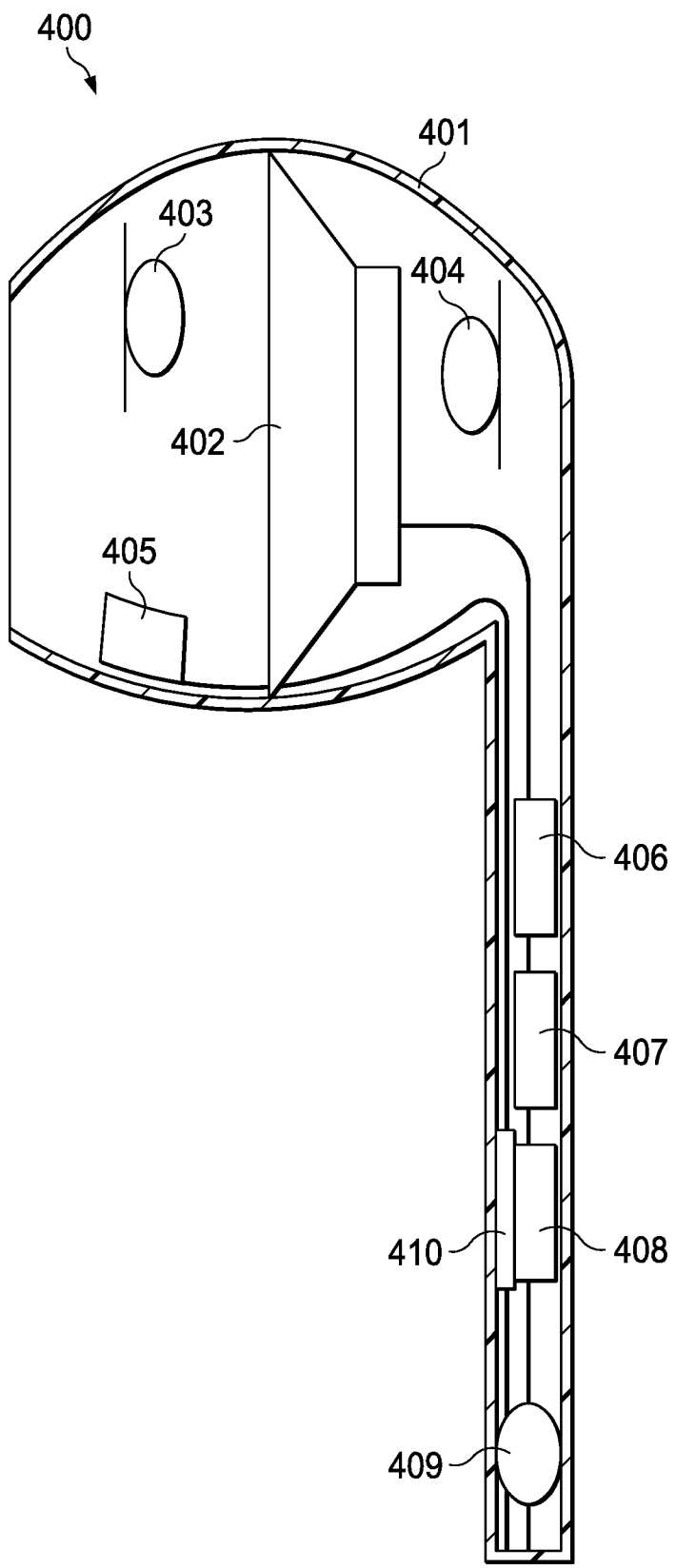
FIG. 4 illustrates an example ear device, according to an embodiment.

FIG. 4 illustrates an example ear device, according to an embodiment. In this example, the ear device is an earbud of a wireless headset described in U.S. Pat. No. 9,913,022, which is incorporated by reference herein in its entirety.

Referring to FIG. 4. earbud 400 of a wireless headset is worn in the right ear of a user. A similar earbud can be worn in the left ear of the user. Earbud 400 includes housing 401 that contains loudspeaker 402, front microphone 403, rear microphone 404, IMU 405, processor 406, communication interface 407, battery device 408, end microphone 409 and force sensor 410. Front microphone 403 faces the direction of the eardrum and rear microphone faces the opposite direction of the eardrum. End microphone 409 is located in an end portion of earbud 401, close to the user's mouth. In an embodiment, beamformer patterns are formed using rear microphone 404 and end microphone 409 to capture the user's speech (left pattern) and to capture the ambient noise (right pattern), respectively.

In an embodiment, processor 406 can be a digital signal processing (DSP) chip that provides audio signals to loudspeaker 402, processes noise and wind levels captured by at least one of the microphones 403, 404, 409, and processes speech commands captured by end microphone 409. Processor 406 also captures and processes output from IMU 405, such as receiving sensor data from IMU 405 and determines changes in roll, pitch and yaw angles in body system coordinates based on sensor data (e.g., acceleration data, rotation rates) provided by inertial sensors in IMU 405. IMU 405 can include one or more inertial sensors, such as one or more accelerometers and/or one or more gyro sensors. Processor 406 also captures and processes the output of force sensor 410 to determine if a particular type of input was provided by the user, such as press and hold input or press and hold release, as previously described. Processor 406 can include cache memory for storing data, such as a reference attitude data (e.g., a delta quaternion) described in reference to FIGS. 1A-1D.

Communication interface 407 can include a wireless transceiver chip (e.g., a Bluetooth™ chip) to communicate bi-directionally with a companion device, such as a smart phone or computer.

Battery device 408 can includes a rechargeable battery and associated charging circuitry, including but not limited to power management circuitry and inductive charging circuitry for charging the ear devices inductively through a carrying case.

Force sensor 410 is used to receive input from a user. Force sensor 410 is a transducer that converts an input mechanical compression or pressure into an electrical output signal. The output can be coupled to processor 406 that can count presses and detect holds input by the user, as previously described. There can be one or more force sensors 410 in one or both the right and left earbuds and each force sensor can perform different functions, such as skipping tracks, invoking noise cancellation, switching to transparency mode and controlling volume by detecting a press and hold input, as described in reference to FIGS. 1A-1D and FIGS. 2A-2C. In some embodiments, a touch sensor (e.g., a capacitive sensor) can also be included in earbud 401 for receiving touch input or gestures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
   determining, with at least one processor of an ear device, a reference attitude of the ear device based on sensor data collected by motion sensors of the ear device;
   storing, with the at least one processor, the reference attitude;
   receiving, with at least one processor, a first user input indicating a user request for a volume control mode of the ear device;
   receiving, with the at least one processor, a rotation input;
   determining, with the at least one processor, an amount of volume level increase or decrease based on attitude change relative to the reference attitude due to the rotation input;
   adjusting, with the at least one processor, a volume level of the ear device in accordance with the volume level increase or decrease, wherein the volume level increases or decreases by an incremental amount as a function of incremental angle displacement resulting from the rotation input; and
   receiving, with the at least one processor, second user input indicating a second user request to release the volume control mode.

2. The method of claim 1, wherein the first user input is a press and hold input.

3. The method of claim 1, wherein the second user input is a press and hold release input.

4. The method of claim 1, wherein after receiving the first user input, the ear device plays a tone or message through a loudspeaker indicating that the ear device has been transitioned into a volume control mode.

5. The method of claim 1, wherein the rotation input is a rotation of the ear device relative to a head of a user who is wearing the ear device.

6. The method of claim 1, wherein the rotation input is a rotation of the ear device together with a head of a user who is wearing the ear device as a single unit.

7. The method of claim 6, wherein the rotation input is due to nodding of the user's head.

8. The method of claim 6, wherein the rotation input is due to rotation of the user's head about an axis of rotation that is perpendicular to a top of the user's head.

9. The method of claim 1, wherein determining an amount of volume level increase or decrease based on attitude change relative to the reference attitude, further comprises:
   applying a logarithmic volume scaling function to the attitude change, such that volume increases or decreases exponentially with attitude change.

10. The method of claim 1, wherein the first or second inputs are a touch input or gesture.

11. An ear device comprising:
    a housing configured to be worn on or over a user's outer ear or in the user's ear canal;
    included in the housing:
       a loudspeaker;
       at least one inertial sensor;
       an input device; and
       at least one processor;
       memory storing instructions that when executed by the at least one processor, cause the at least one processor to perform operations comprising:
          determining a reference attitude of the ear device based on sensor data collected by the at least one inertial sensor;
          storing, in the memory, the reference attitude;
          receiving, with the input device, a first user input indicating a user request for a volume control mode of the ear device;
          receiving, with the at least one inertial sensor, a rotation input;
          determining an amount of volume level increase or decrease based on attitude change relative to the reference attitude due to the rotation input;
          adjusting a volume level of the ear device in accordance with the volume level increase or decrease, wherein the volume level increases or decreases by an incremental amount as a function of incremental angle displacement resulting from the rotation input; and
          receiving second user input indicating a second user request to release the volume control mode.

12. The ear device of claim 11, wherein the first user input is a press and hold input.

13. The ear device of claim 11, wherein the second user input is a press and hold release input.

14. The ear device of claim 11, wherein after receiving the first user input, the ear device plays a tone or message through a loudspeaker indicating that the ear device has been transitioned into a volume control mode.

15. The ear device of claim 11, wherein the rotation input is a rotation of the ear device relative to a head of a user who is wearing the ear device.

16. The ear device of claim 11, wherein the rotation input is a rotation of the ear device together with a head of a user who is wearing the ear device as a single unit.

17. The ear device of claim 16, wherein the rotation input is due to nodding of the user's head.

18. The ear device of claim 16, wherein the rotation input is due to rotation of the user's head about an axis of rotation that is perpendicular to a top of the user's head.

19. The ear device of claim 11, wherein determining an amount of volume level increase or decrease based on attitude change relative to the reference attitude further comprises:
    applying a logarithmic volume scaling function to the attitude change, such that volume increases or decreases exponentially with attitude change.

20. The ear device of claim 11, wherein the first or second inputs are a touch input or gesture.

* * * * *